(12) United States Patent
White et al.

(10) Patent No.: US 10,742,817 B1
(45) Date of Patent: Aug. 11, 2020

(54) CONFERENCE CALL NOTIFICATION AND SETUP CONFIGURATION

(71) Applicant: West Corporation, Omaha, NE (US)

(72) Inventors: Karen Sue White, Omaha, NE (US); Santhosh Shetty, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 16/121,846

(22) Filed: Sep. 5, 2018

(51) Int. Cl.
*H04M 3/56* (2006.01)
*G06K 19/06* (2006.01)
*G06F 16/955* (2019.01)

(52) U.S. Cl.
CPC ........ *H04M 3/562* (2013.01); *G06F 16/9554* (2019.01); *G06K 19/06037* (2013.01); *H04M 3/565* (2013.01)

(58) Field of Classification Search
CPC ... H04M 3/562; H04M 3/565; G06F 16/9554; G06K 19/06037

USPC ........... 379/202.01, 201.01, 203.01, 205.01, 379/206.01, 204.01, 207.11, 207.02
See application file for complete search history.

(56) References Cited

U.S. PATENT DOCUMENTS

2004/0199580 A1\* 10/2004 Zhakov ............... H04L 12/1818
709/204
2009/0220064 A1\* 9/2009 Gorti ...................... H04M 3/56
379/202.01

\* cited by examiner

*Primary Examiner* — Thjuan K Addy (57) ABSTRACT

One example method of operation may include receiving a conference request from a moderator device, retrieving user profiles, included in the conference request, stored in a database, transmitting a conference access code to the user devices associated with the user profiles, retrieving and applying a moderator conference call agenda to a conference call at a conference call maturity time, and enacting one or more restrictions during the conference call based on the moderator conference call agenda.

14 Claims, 6 Drawing Sheets

CONFERENCE CALL NOTIFICATION AND SETUP CONFIGURATION

TECHNICAL FIELD OF THE APPLICATION

This application relates to call management and more specifically to a customized conference call notification and setup configuration.

BACKGROUND OF THE APPLICATION

Conventionally, when a person desires to setup a conference call at a later time, the ease of connecting to various different users via their computing/telephonic devices and ensuring a proper conference call format is usually not realized. A conference leader or moderator may have specific goals when conducting the conference. The goals may include having certain individuals on the conference bridge at a specific time, however, other goals may be desired as well which are not identified and are not translated to a single point of entry into the conference call by the invitees.

SUMMARY OF THE APPLICATION

Example embodiments of the present application provide at least a method that includes at least one of receiving a conference request from a moderator device, retrieving a plurality of user profiles, included in the conference request, stored in a database, transmitting a conference access code to a plurality of user devices associated with the plurality of user profiles, retrieving and applying a moderator conference call agenda to a conference call at a conference call maturity time, and enacting one or more restrictions during the conference call based on the moderator conference call agenda.

Another example embodiment may include a system that provides a moderator device, and a conference server configured to receive a conference request from the moderator device, retrieve a plurality of user profiles, included in the conference request, stored in a database, transmit a conference access code to a plurality of user devices associated with the plurality of user profiles, retrieve and apply a moderator conference call agenda to a conference call at a conference call maturity time, and enact one or more restrictions during the conference call based on the moderator conference call agenda.

Another example embodiment may include a non-transitory computer readable storage medium configured to store instructions that when executed cause a processor to perform receiving a conference request from a moderator device, retrieving a plurality of user profiles, included in the conference request, stored in a database, transmitting a conference access code to a plurality of user devices associated with the plurality of user profiles, retrieving and applying a moderator conference call agenda to a conference call at a conference call maturity time, and enacting one or more restrictions during the conference call based on the moderator conference call agenda.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide an application operating on a user device, such as a smartphone, cellular phone, tablet device, laptop or other computing device with a memory and processor. The application may communicate with a network to reach a remote destination, such as a conference call processing center or service provider. The server managing the conference calls may retrieve the moderator's profile when an attempt to setup a call is performed. The moderator's preferences and information pertaining to the invitees is also retrievable when applying the specific conference preference parameters to the conference call.

Figure 1:
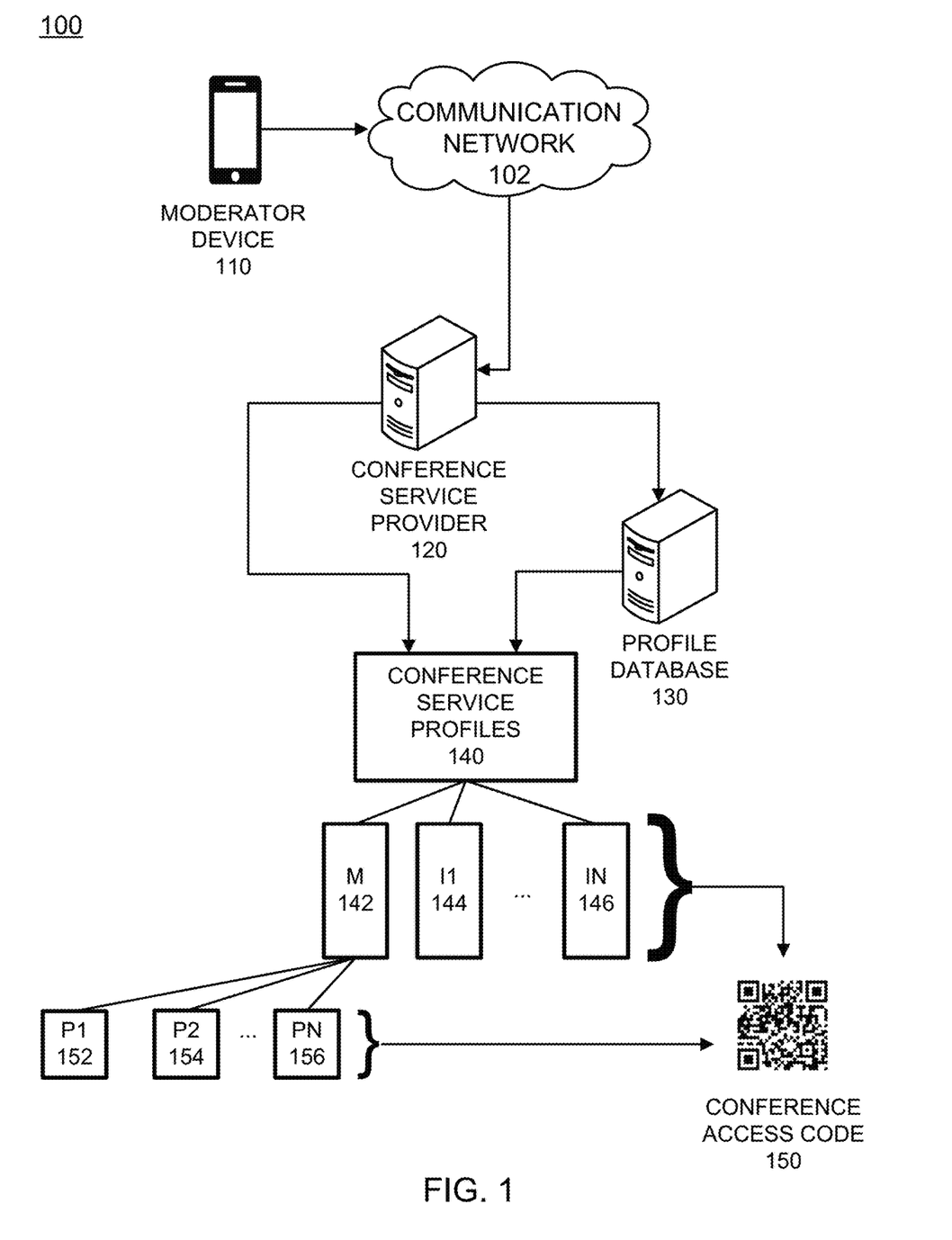
FIG. 1 illustrates an example communication network system example of establishing a conference call setup according to example embodiments.

FIG. 1 illustrates an example communication network system example of managing a conference call according to example embodiments. Referring to FIG. 1, the diagram 100 includes a moderator device 110, which represents a conference call setup entity seeking access to the conference service provider server 120 via communication network 102. The communication network 102 may be a cellular network, data network, or other communication network that can receive calls/messages and process calls/messages via a call management queue infrastructure.

The profile database 130 may be a separate, shared or stand-alone computing device, which provides the conference service profiles 140 of the moderator and any invitees. In one example, once the moderator initiates a conference to include his or her device and a list of invitees to attend the conference. Those profiles 140 may be retrieved from the profile database 130. The profiles may include the moderator profile 142, and 1 . . . N invitee profiles 144-146. Each of the profiles, including the moderator and invitee profiles may have corresponding preferences associated with the profile data. In this example, the preferences 152-156 (P1 . . . PN) correspond only to the moderator profile 142. However, the invitees may have preferences of their own which can also be applied, such as device preferences, communication preferences, etc. All the conference information including the member information, the content of the conference, the dates, the access codes, the pin numbers, and the preferences may be linked to a single quick response (QR) code 150 that is generated and messaged to the list of attendees in an e-mail, SMS message, etc.

In operation, the QR code 150 is generated and sent as an email, short message service (SMS) message, etc. to the invitees and the moderator as the leader of the conference. When the conference date and time matures, the conference may be enacted and invitees can scan the code with a code reader application on their phone, tablet, computing device to enter the conference directly without dialing a telephone number and entering the conference access code, as all that necessary information is included in the QR code sent to each member of the conference. The moderator may have an agenda as a set of preferences and content to share during the conference. The agenda may include a list of information, files to upload to a conference application platform and interface, times for presentation and a set of mute and interaction times during which the invitees can speak, or are not permitted to speak, and can then discuss the conference information.

Certain examples of moderator preferences to apply to the conference include a particular agenda, which includes a timeline of total conference time, time slots during which certain sub-topics will be discussed, and data files, such as content files, audio, video, etc., to share in a conference interface during the time slots identified by the agenda. The invitees may have certain restrictions and/or privileges during certain time slots, such as no communication capabilities to share information, ask questions, etc., until a segment is finished and then all such invitees may be invited to speak and share information for a set period of time until a next segment is initiated. This permits the conference to be conducted without unexpected interruptions. For example, at the end of a first segment (i.e., 10 minutes), all invitees may receive a prompt via the conference application to ask questions and share information for a set period of time, such as 5 minutes. The segment may be fulfilled once the time designated for the conference segment has ended for that particular segment.

In addition to time-tracked segments, actions may be identified via voice recognition or other artificial intelligence techniques to initiate a change in the active conference status. For example, the moderator may have a preference to apply a change in the conference status as defined by a particular term. For instance, the moderator may have a defined term, such as "any questions" as a trigger term to open the discussion forum to permit the invitees to share information and ask questions which they were not permitted to do prior to that key term being spoken and identified by the application's voice recognition tools.

Another option may be to have a specific time window applied to a particular invitee to ask questions and talk which begins as the invitee begins speaking and ends at a particular set time thereafter, such as two minutes per invitee per segment of the agenda. In this example, if there are five invitees and a segment requires 10 minutes, then if each invitee has two minutes to talk and ask questions then the open discussion may last as long as 10 minutes before the next segment begins and the restrictions are then re-applied until that next segment ends.

Figure 2:
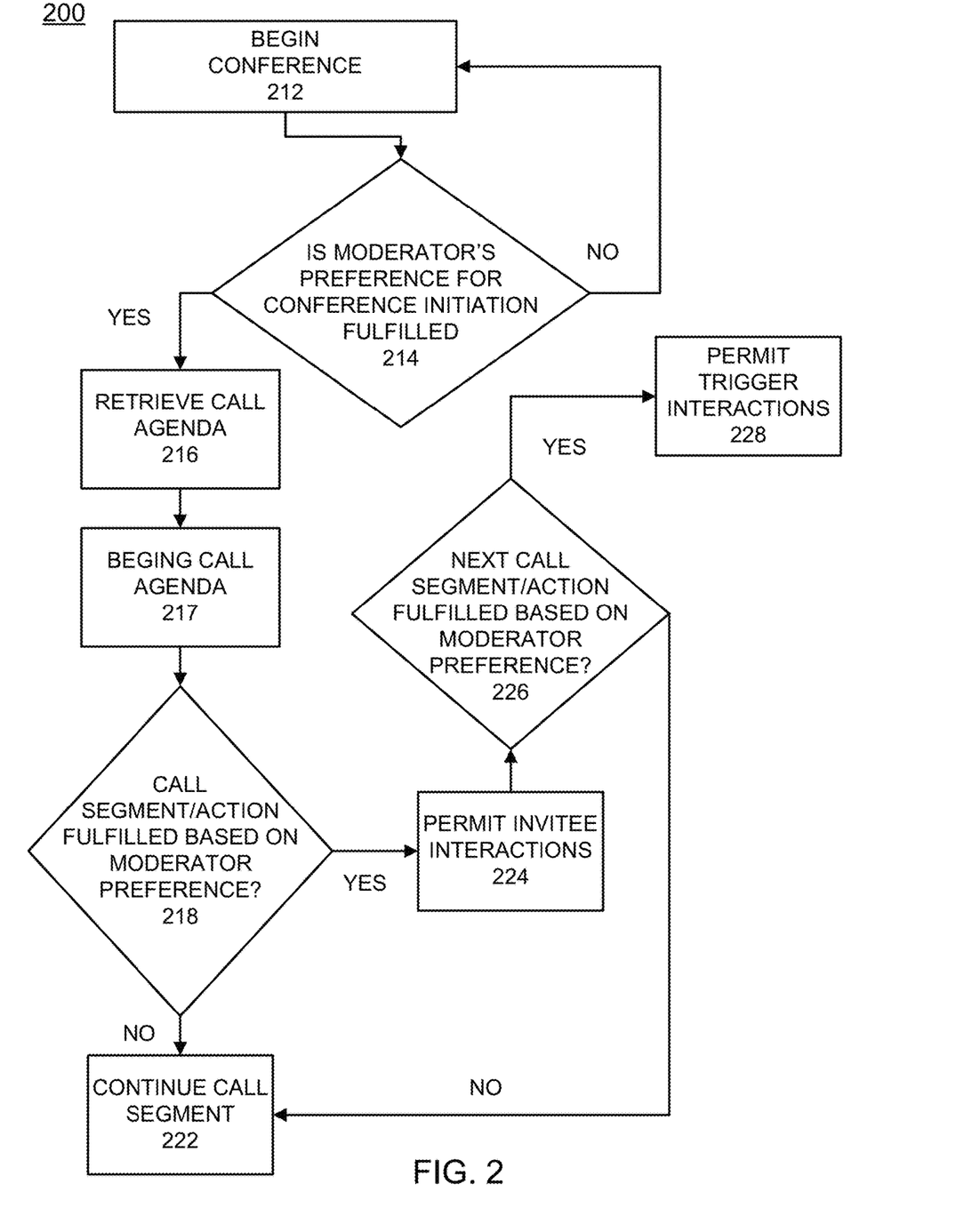
FIG. 2 illustrates a flow diagram procedure for applying a conference call agenda to a conference call according to example embodiments.

FIG. 2 illustrates a flow diagram procedure 200 for beginning a moderator-controlled conference with applied preferences according to example embodiments. Referring to FIG. 2, the logic diagram 200 begins with a conference initiation operation 212, the conference may begin with a moderator required preference being fulfilled 214, such as a start time, a certain number of the invitees having accessed a conference bridge virtual waiting room, the agenda being loaded, and/or once the moderator has scanned his or her QR code and has entered the conference. Once the conference is active the moderator's agenda may be retrieved 216 and applied to the conference application. This may include a time window, various segments as sub-portions of the conference, defined interaction times, trigger words that when spoken by the moderator and/or the invitees invokes a change in the invitee status (e.g., muted, unmuted, invited to speak).

Continuing with the same example, an initial call segment (e.g., 10 minutes) of the call agenda 217 may eventually end and the moderator's criteria for changing the current conference status may be required to be satisfied 218. If not, the conference may continue along the same segment 222. If so, the conference may then permit the invitees to begin interacting 224 for a defined period of interaction, such as 5-10 minutes. Once that time window expires, the next segment may be loaded 226 to include a new topic, a new header, a new set of data files to share and a new time window for the next segment. Once that next segment has ended, the conference may permit additional trigger interactions 228 to change the current conference status, such as trigger words spoken by the moderator and/or the invitees and/or an additional question and answer session, prior to the next stage of the conference.

Figure 3:
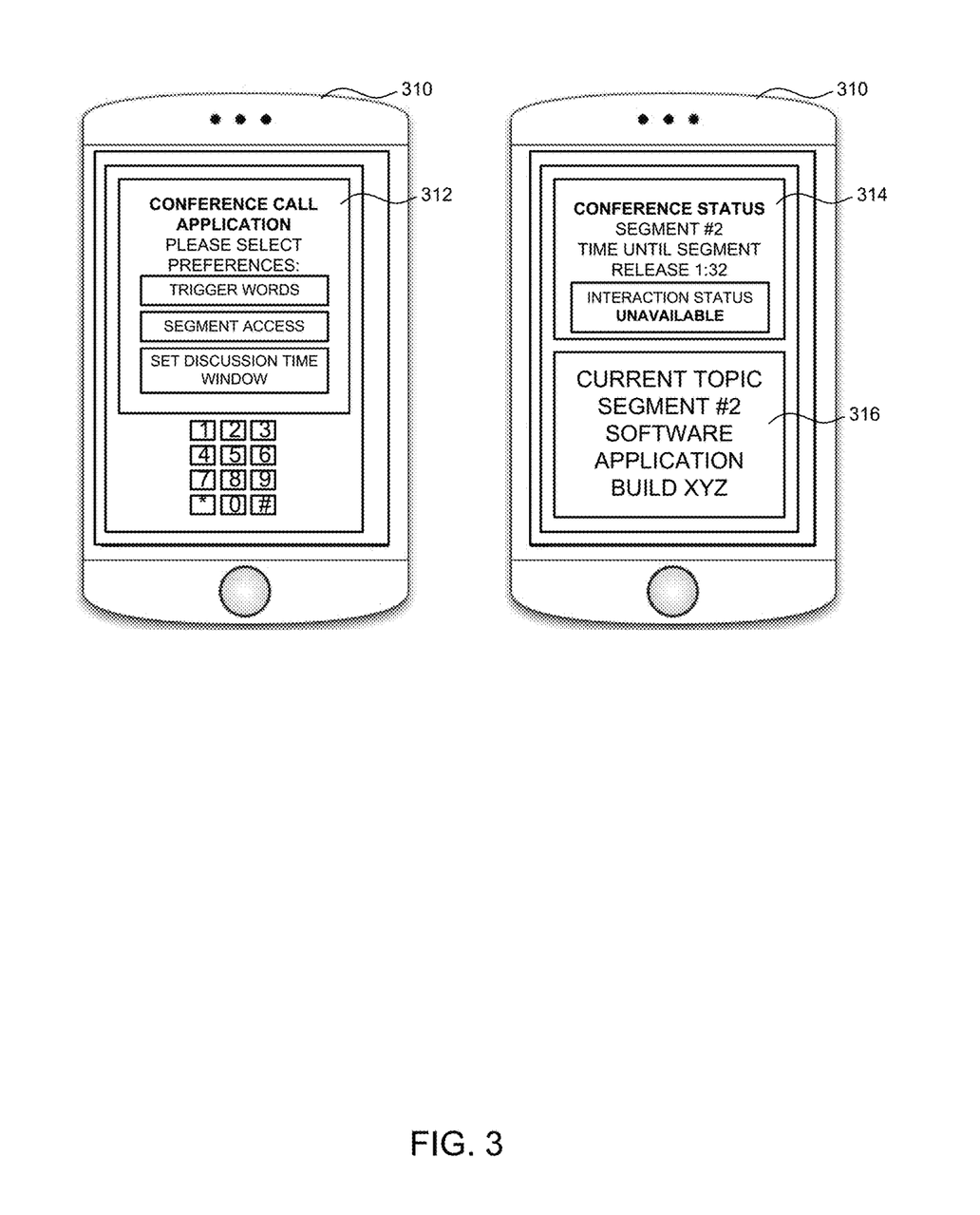
FIG. 3 illustrates a user interface configured to provide conference call setup and active call configuration options according to example embodiments.

FIG. 3 illustrates a set of user interfaces 300 configured to provide access to a conference call service according to example embodiments. Referring to FIG. 3, the sample user interfaces of the user device 310 are those which may be viewable to a call moderator when setting-up the conference. For example, the conference call preference menu 312 may permit the moderator to allow trigger words to change the conference status from closed (moderator only) to open (all invitees can speak). The segment access option may define the number of segments, lengths of segments, titles and other materials to share during the segments. A window discussion time may also be used to define the length of segments and interaction segments between moderator-defined segments. In the next window, the conference status 314 identifies an active conference, segment, and interaction status of members not including the moderator at the current time. Also, a countdown is illustrated to demonstrate the time window until the segment is finished. The lower portion 316 defines the details of the segment and may illustrate data files, audio files, video files, etc., to be shared during the conference.

Figure 4:
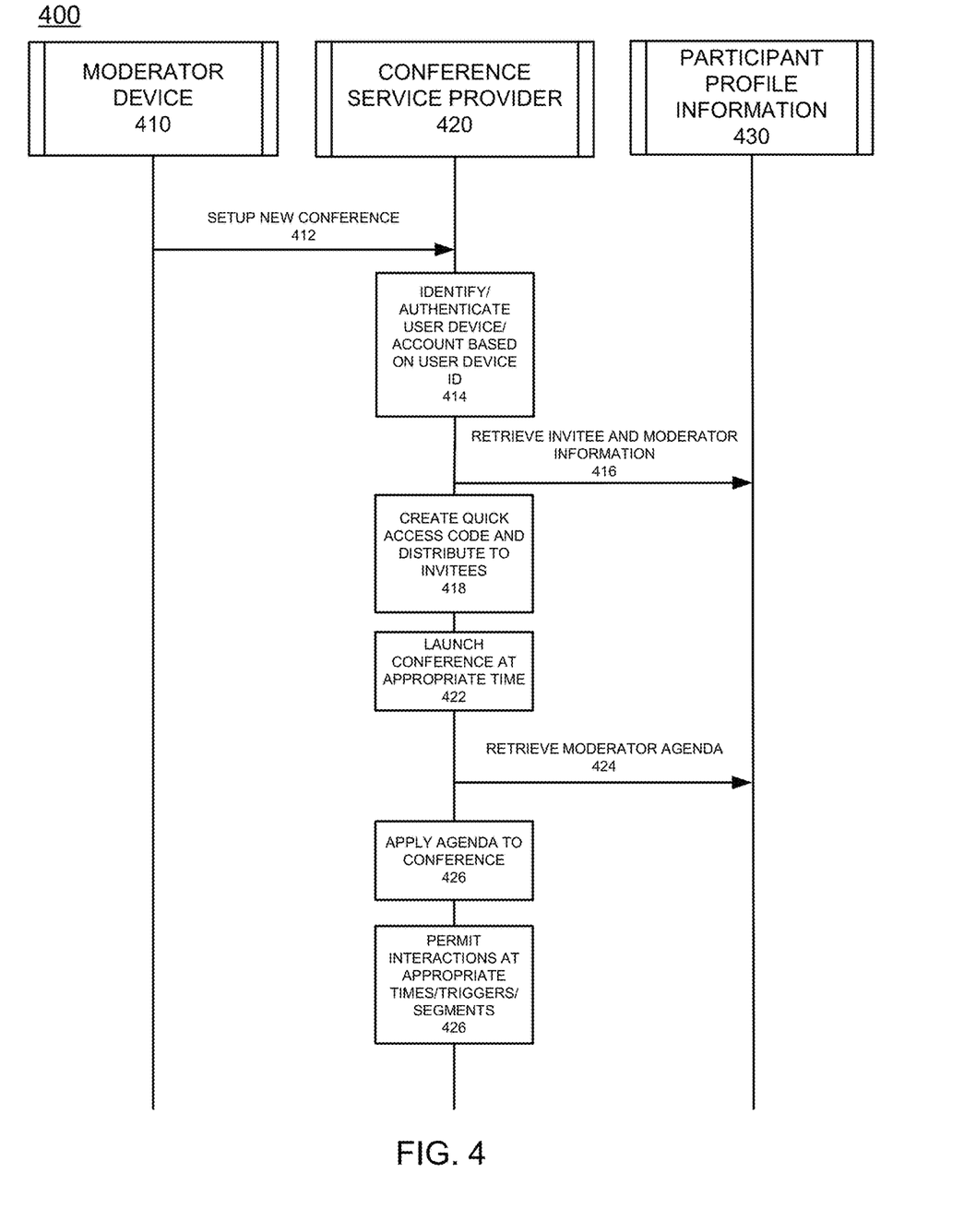
FIG. 4 illustrates a system signaling diagram for performing a conference call setup and management configuration according to example embodiments.

FIG. 4 illustrates a system signaling diagram for conducting call queue management according to example embodiments. Referring to FIG. 4, the configuration 400 provides an example use case and conference setup and execution procedure. The components include a moderator device 410, a conference service provider 420 and a database of participant profile information 430. In operation, a new conference is setup 412 by the moderator requesting a new conference by a communication to a service provider 420. The service provider 420 can then authenticate the user device and the account information 414. The service provider may then retrieve the invitee and moderator profile information 416 as identified in the request for a new conference. The service provider may then create a custom QR code 418, launch a conference at an appropriate time 422, retrieve a moderator agenda 424 and apply the agenda to the conference 426 at the appropriate time. Once the conference is active, the interaction session defined in the agenda can be enacted based on set times, triggers and ends of segments which permit fixed interaction times to occur therebetween.

One example method of operation may include receiving a conference request from a moderator device, retrieving a plurality of user profiles, included in the conference request, stored in a database, transmitting a conference access code to a plurality of user devices associated with the plurality of user profiles, retrieving and applying a moderator conference call agenda to a conference call at a conference call maturity time, and enacting one or more restrictions during the conference call based on the moderator conference call agenda.

The method also include initiating a first conference call segment associated with the conference call agenda, wherein the first conference call segment is allotted a portion of time of a total time allotted to the conference call, and when the first conference call segment is complete, removing the one or more restrictions for a predetermined period of time, identifying a trigger word spoken during the conference call via a voice recognition function of a conference call application, and comparing the trigger word to one or more trigger words associated with moderator preferences. When the trigger word matches the one or more triggers words associated with the moderator preferences, removing the one or more restrictions for a predetermined period of time. The one or more restrictions include a restriction on: speaking times, modifications to a shared file, and communication between conference participants. The moderator conference call agenda includes a plurality of conference call segments and a plurality of interaction time frames all of which collectively define a conference call time window, and the conference call access code comprises a quick response (QR) code that includes a telephone number and access code used to access the conference call at a defined conference call start time.

Figure 5:
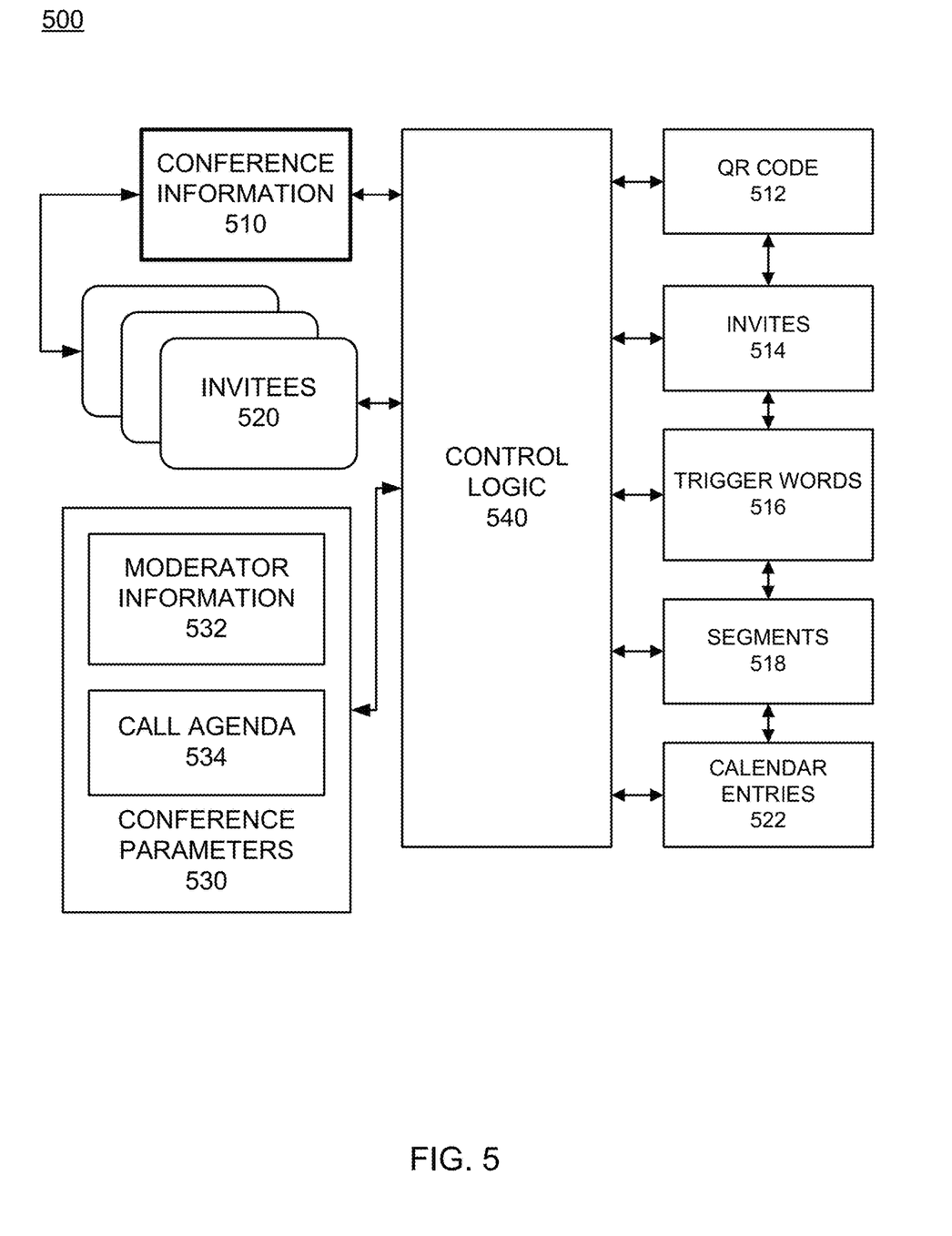
FIG. 5 illustrates a logic diagram with the input and output data managed by a controller to provide conference call management according to example embodiments.

FIG. 5 illustrates a logic diagram 500 with the input and output data managed by a controller to provide call queue management according to example embodiments. Referring to FIG. 5, the logic provides input data of requested conference information 510, the invitee list 520, the conference parameters 530 setup by the moderator along with the moderate information 532 and call agenda 534. The logic will produce a conference setup procedure that includes output data, such as the QR code 512 to access the conference, the invites 514 sent to the invitees, trigger keywords 516 setup by the moderator for changes in a conference status, segments 518 for the conference activities and calendar entries 522 for conference reminders.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
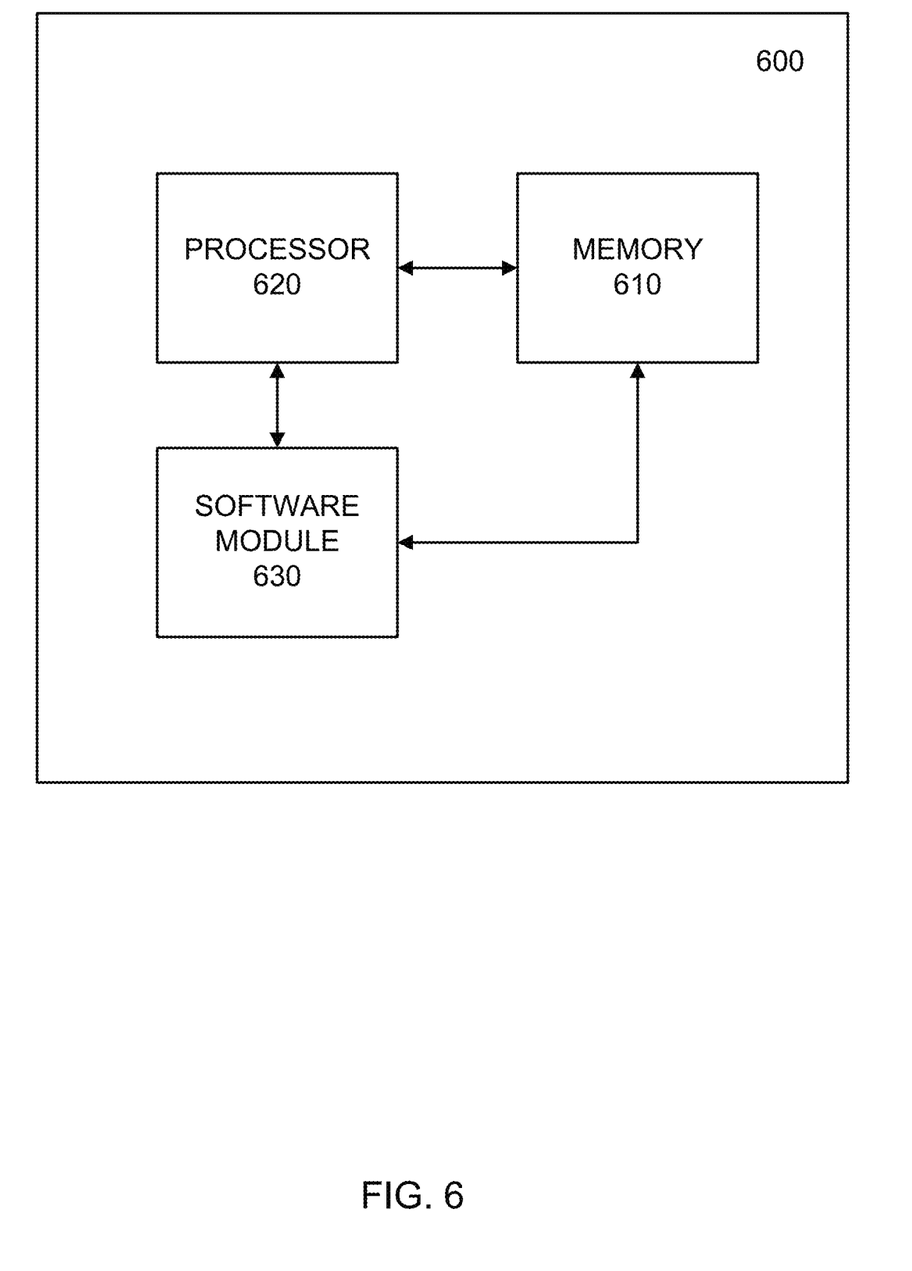
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    receiving a conference request from a moderator device;
    retrieving a plurality of user profiles, included in the conference request, stored in a database;
    transmitting a conference access code to a plurality of user devices associated with the plurality of user profiles;
    retrieving and applying a moderator conference call agenda to a conference call at a conference call maturity time;
    enacting one or more restrictions during the conference call based on the moderator conference call agenda;
    receiving a verbal input from a user device of the plurality of user devices;
    comparing the verbal input to one or more trigger words associated with the moderator conference call agenda; and
    suspending the one or more restrictions for a predetermined period of time based on the verbal input being identified as a trigger word.

2. The method of claim 1, further comprising:
    initiating a first conference call segment associated with the conference call agenda, wherein the first conference call segment is allotted a portion of time of a total time allotted to the conference call; and
    when the first conference call segment is complete, removing the one or more restrictions for a predetermined period of time.

3. The method of claim 1, wherein the one or more restrictions comprise a restriction on:
    speaking times, modifications to a shared file, and communication between conference participants.

4. The method of claim 1, wherein the moderator conference call agenda comprises a plurality of conference call segments and a plurality of interaction time frames all of which collectively define a conference call time window.

5. The method of claim 1, wherein the conference call access code comprises a quick response (QR) code that includes a telephone number and access code used to access the conference call at a defined conference call start time.

6. A system comprising:
    a moderator device; and
    a conference server configured to:
        receive a conference request from the moderator device,
        retrieve a plurality of user profiles, included in the conference request, stored in a database,
        transmit a conference access code to a plurality of user devices associated with the plurality of user profiles,
        retrieve and apply a moderator conference call agenda to a conference call at a conference call maturity time,
        enact one or more restrictions during the conference call based on the moderator conference call agenda,
        receive a verbal input from a user device of the plurality of user devices, compare the verbal input to one or more trigger words associated with the moderator conference call agenda, and suspend the one or more restrictions for a predetermined period of time based on the verbal input being identified as a trigger word.

7. The system of claim 6, wherein the conference server is further configured to:

initiate a first conference call segment associated with the conference call agenda, wherein the first conference call segment is allotted a portion of time of a total time allotted to the conference call; and when the first conference call segment is complete, remove the one or more restrictions for a predetermined period of time.

8. The system of claim 6, wherein the one or more restrictions comprise a restriction on:

speaking times, modifications to a shared file, and communication between conference participants.

9. The system of claim 6, wherein the moderator conference call agenda comprises a plurality of conference call segments and a plurality of interaction time frames all of which collectively define a conference call time window.

10. The system of claim 6, wherein the conference call access code comprises a quick response (QR) code that includes a telephone number and access code used to access the conference call at a defined conference call start time.

11. A non-transitory computer readable storage medium configured to store one or more instructions that when executed by a processor cause the processor to perform:

receiving a conference request from a moderator device;

retrieving a plurality of user profiles, included in the conference request, stored in a database;

transmitting a conference access code to a plurality of user devices associated with the plurality of user profiles;

retrieving and applying a moderator conference call agenda to a conference call at a conference call maturity time;

enacting one or more restrictions during the conference call based on the moderator conference call agenda;

receiving a verbal input from a user device of the plurality of user devices;

comparing the verbal input to one or more trigger words associated with the moderator conference call agenda; and suspending the one or more restrictions for a predetermined period of time based on the verbal input being identified as a trigger word.

12. The non-transitory computer readable storage medium of claim 11, further medium configured to store one or more instructions that when executed by the processor cause the processor to perform:

initiating a first conference call segment associated with the conference call agenda, wherein the first conference call segment is allotted a portion of time of a total time allotted to the conference call; and when the first conference call segment is complete, removing the one or more restrictions for a predetermined period of time.

13. The non-transitory computer readable storage medium of claim 11, wherein the one or more restrictions comprise a restriction on:

speaking times, modifications to a shared file, and communication between conference participants.

14. The non-transitory computer readable storage medium of claim 11, wherein the moderator conference call agenda comprises a plurality of conference call segments and a plurality of interaction time frames all of which collectively define a conference call time window, and wherein the conference call access code comprises a quick response (QR) code that includes a telephone number and access code used to access the conference call at a defined conference call start time.

\* \* \* \* \*